United States Patent [19]

Bailey et al.

[11] 4,214,537
[45] Jul. 29, 1980

[54] GRAIN DRILL FURROW OPENING ASSEMBLY

[75] Inventors: Alfred J. Bailey, Berkswell; Ronald S. Sargent, Kenilworth, both of England

[73] Assignee: Massey-Ferguson Services N.V., Curacao, Netherlands Antilles

[21] Appl. No.: 887,389

[22] Filed: Mar. 16, 1978

[30] Foreign Application Priority Data

Mar. 29, 1977 [GB] United Kingdom ............... 13058/77
Oct. 21, 1977 [GB] United Kingdom ............... 43851/77

[51] Int. Cl.² .............................................. A01C 5/06
[52] U.S. Cl. ......................................... 111/85; 111/62; 111/87; 111/88
[58] Field of Search ....................... 172/484, 195, 307; 111/84, 85, 87, 88, 52, 83, 86, 59–66, 81

[56] References Cited

U.S. PATENT DOCUMENTS

| | | | |
|---|---|---|---|
| 702,402 | 6/1902 | Chaplin | 111/87 |
| T862,011 | 5/1969 | Koronka et al. | 111/88 |
| 2,004,416 | 6/1935 | Orelind | 111/59 |
| 2,031,640 | 2/1936 | Geraldson | 111/59 |
| 2,297,384 | 9/1942 | Benjamin | 172/484 X |
| 2,713,836 | 7/1955 | Ajero | 111/84 |
| 2,733,646 | 2/1956 | Sheffield | 172/195 |
| 2,997,117 | 8/1961 | Paige | 172/307 X |
| 3,705,560 | 12/1972 | Lappin | 172/484 X |
| 3,749,035 | 7/1973 | Cayton et al. | 172/484 X |
| 3,845,730 | 11/1974 | Koronka et al. | 111/88 |

FOREIGN PATENT DOCUMENTS

| | | | |
|---|---|---|---|
| 710879 | 6/1954 | United Kingdom | 172/307 |
| 161151 | 6/1964 | U.S.S.R. | 172/307 |

Primary Examiner—Edgar S. Burr
Assistant Examiner—Steven A. Bratlie
Attorney, Agent, or Firm—Robert L. Farris

[57] ABSTRACT

A seed drill has a frame, a transverse hopper and a series of triple disc coulters mounted on the frame below the hopper. The coulters are each mounted on the frame by a parallelogram linkage which maintains the proper relative positions of the front and rear discs of the coulters at different penetration depths and permits the maximum transport height of the coulters.

2 Claims, 16 Drawing Figures

GRAIN DRILL FURROW OPENING ASSEMBLY

This invention relates to seed or seed and fertilizer drills having a series of furrow opening coulters each comprising spaced first and second soil-engageable members positioned one behind the other with respect to the direction of operative forward motion of the drill. An example of such a coulter has a first soil engageable member comprising a rotatable slit-opening disc and a second soil-engageable member comprising two slit-widening discs, the slit-widening discs being positioned behind the slit-disc with respect to the direction of operative forward motion of the drill and being inclined with respect to each other.

In the design of such a drill, and particularly so if it is comtemplated that the drill should be suitable for direct drilling (no-till) work i.e. drilling direct into the soil without any prior tillage operations, three problems arise. Firstly there is limited space below the hopper in which to raise the coulters to an adequate transport position. Secondly, there is the problem of maintaining the proper relative positions of the first and second soil-engageable members at different sowing depths. Thirdly there is a need for the possibility of providing simple means for adjusting the attitude of the coulters relative to the ground to compensate for unequal wear of the first and second soil-engageable members during use, and for manufacturing tolerances.

An object of the invention is to provide a seed or seed and fertilizer drill which more nearly meets these requirements than previously proposed drills.

According to the invention there is provided a seed or seed and fertilizer drill comprising:

a frame;

a hopper mounted on the frame and extending transverse to the direction of operative forward motion of the drill across a major portion of the sowing width of the drill;

a series of coulters for opening furrows in the soil;

mounting means mounting the coulters on the frame at positions which are spaced apart in a direction transverse to the direction of operative forward motion of the drill, the mounting means permitting the coulters to be raised and lowered relative to the frame, and at least a portion of each coulter lying directly below the hopper;

characterized by the following features in combination:

each coulter comprises spaced first and second soil-engageable members positioned one behind the other with respect to the direction of operative forward motion of the drill; and the mounting means mounting each coulter on the frame comprises upper and lower pivoted links which are substantially equal in length and arranged substantially parallel to each other, whereby the attitude of the coulter relative to the frame is maintained substantially constant during raising and lowering of the coulter.

An embodiment of the invention will now be described by way of example with reference to the accompanying drawings, in which:

FIG. 4 shows a side elevation view of the drill of FIG. 3 from the other end, the direction of viewing being from the same side of the drill as in FIG. 2. In FIG. 4, certain parts are indicated merely by dotted or broken lines to enable other parts, which are behind them, to be indicated likewise, so that the relative dispositions of the major parts of the drill can be seen;

Figure 1:
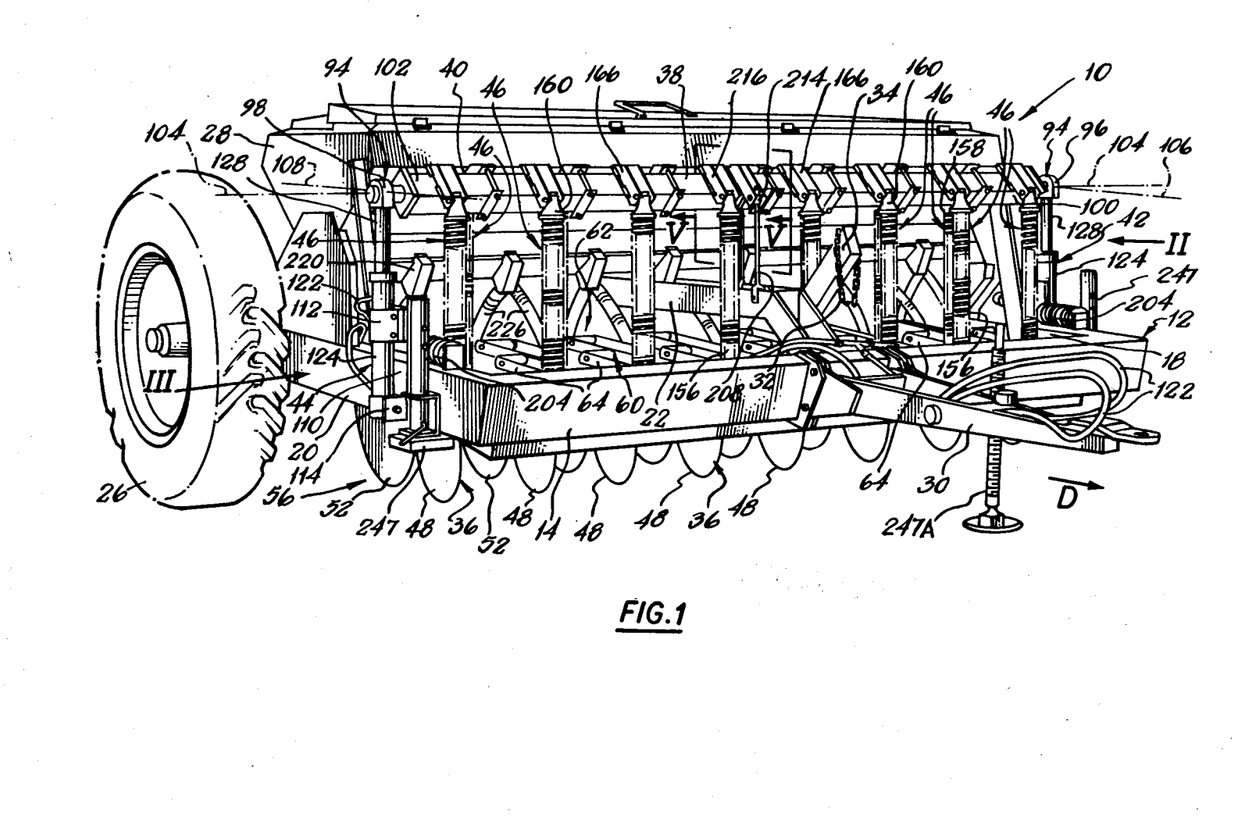
FIG. 1 shows a perspective view from the front and to one side of a combined seed and fertilizer drill, the drill being shown in its transport condition.
Figure 4:
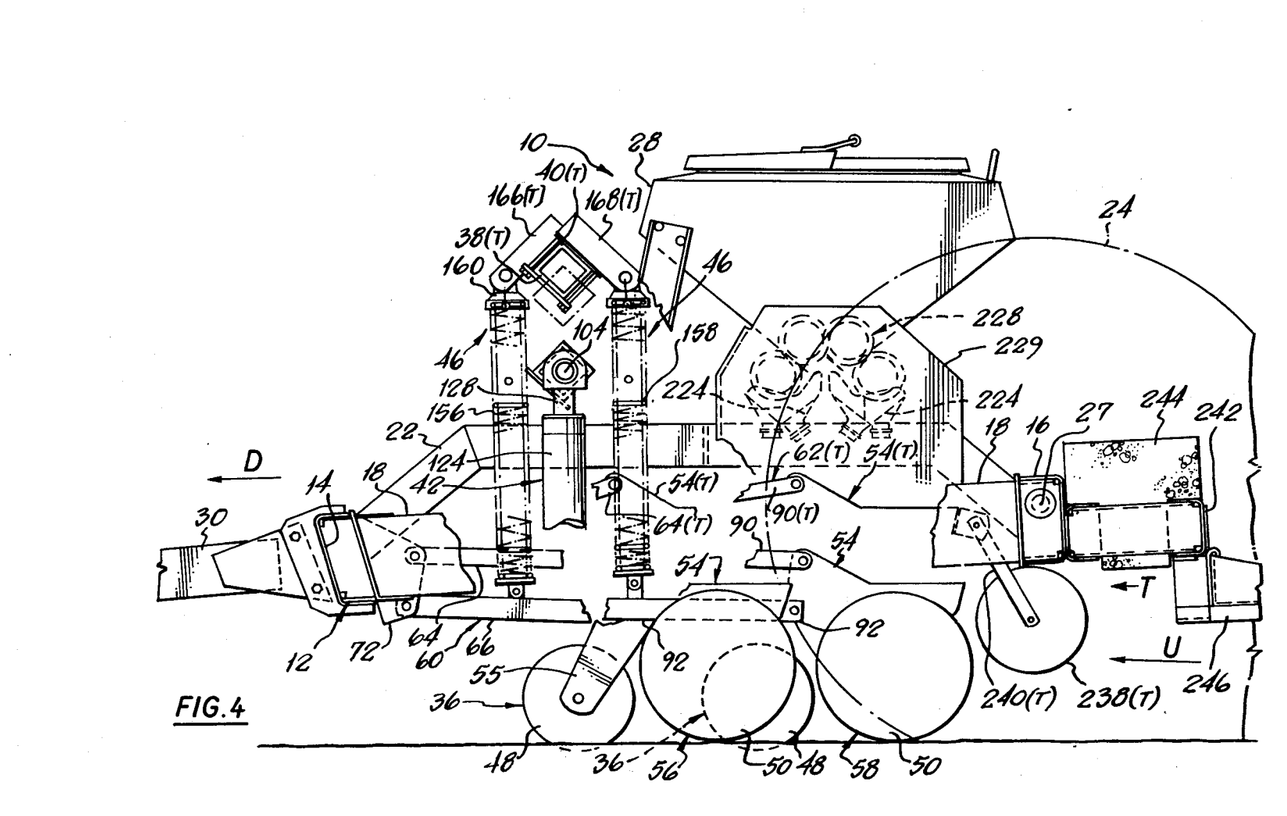

As shown in the drawings, a combined seed and fertilizer drill 10 comprises:

a frame 12, the frame being generally rectangular and formed as a welded structure from U-section folded steel stock. The frame comprises front and rear beams 14, 16 respectively, left and right side beams 18, 20 and a central front to rear stiffening beam 22;

ground engageable wheels 24, 26 to support the frame, the wheels being mounted one at each side of the frame with their axes of rotation 27 in line with rear beam 16 of the frame (see FIG. 4);

a hopper 28 to contain seed and fertilizer, the hopper being mounted on frame 12 and extending transverse to the direction D of operative forward motion of the drill, across the full sowing width of the drill (which is approximately the width of frame 12 measured between side beams 18, 20);

a drawbar 30 mounted on front beam 14 of frame 12, for connection to a drawhook or drawbar on a tractor. The drawbar can be pivoted upwards to a transport position (not shown) in which it is secured by a chain 32 carried by a bracket 34 on central beam 22 of frame 12. Chain 32 and bracket 34 are shown in FIG. 1 only;

a series of coulters 36 for opening furrows in the soil, the coulters being mounted on frame 12 at positions which are spaced apart in a direction transverse to the direction D of operative forward motion of the drill;

a rigid beam 38 to actuate the coulters, the beam extending, at a level above frame 12, transverse to direction D. The beam is a length of square section box beam mounted in a manner to be more fully described below and with (in its mean and transport positions) one, 40, of its corner edges uppermost;

thrust applying means to apply a downthrust to beam 38, comprising two double-acting hydraulic rams 42, 44 mounted, with their longitudinal axes extending vertically, on the side beam 18, 20 of frame 12 and having their pistons connected to coulter actuating beam 38, the rams being actuable to raise and lower the beam relative to frame 12; and resilient thrust transmitting means 46 comprising coiled compression springs to be described more fully below, the springs being connected between coulter actuating beam 38 and the coulters 36 and capable of transmitting downward thrust from the beam to the coulters.

Figures 8, 14, 15:
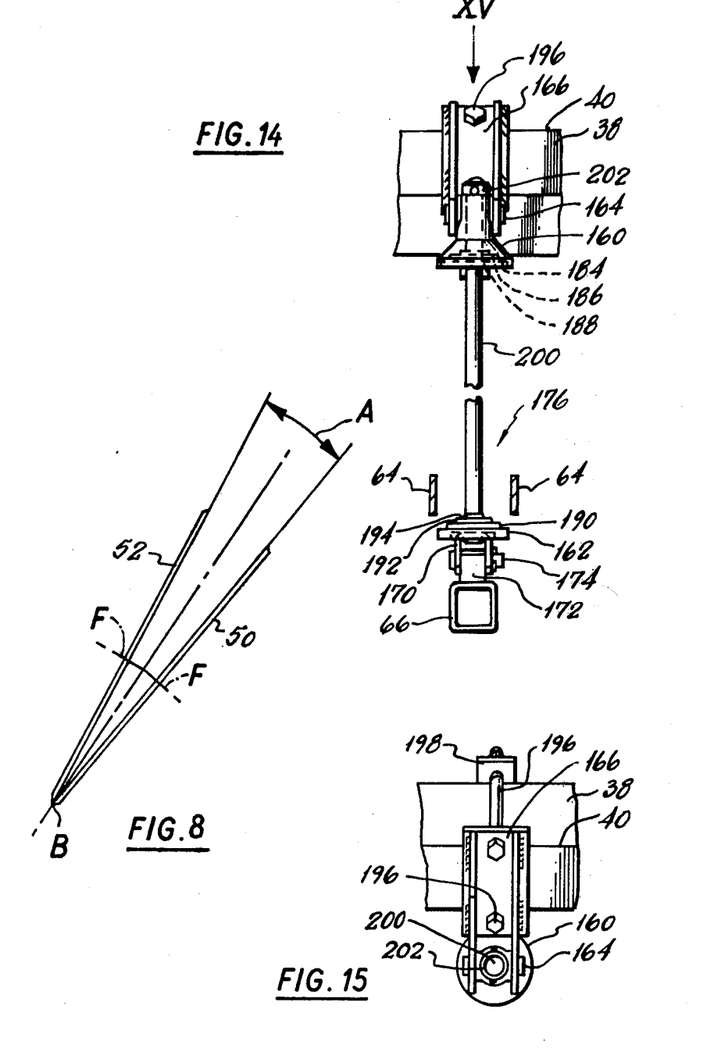
FIG. 8 shows a section on the line VIII—VIII in FIG. 7 through two slit-widening discs of the coulter seen in FIG. 7.
FIG. 14 shows a further section through the pivoted links, the section being taken on the line XIV—XIV in FIG. 7, and FIG. 14 also showing details of mounting means for the coiled compression spring assembly seen in FIG. 7.
FIG. 15 shows a plan view in the direction indicated by arrow XV in FIGS. 7 and 14.

Coulters 36 each comprise a first soil-engageable member in the form of a rotatable slit-opening disc 48 journalled on taper roller bearings protected by triple lip seals, and a second-soil engageable member in the form of two rotatable slit-widening discs 50, 52 journalled on ball bearings also protected by triple lip seals, all three discs being mounted for rotation on a coulter body structure 54 in the form of a heavy casting carrying a pair of forks 55 between which disc 48 is located. The slit-widening discs are positioned behind the slit-opening disc with respect to movement of the drill in direction D and they are aligned straight ahead in direction D but inclined towards each other at an angle A (see FIG. 8) of 12 degrees so as to contact each other at the point on their peripheries indicated in FIGS. 7 and 8 by reference letter B and lying on section line VIII—VIII in FIG. 7 which is inclined at an angle C of 35 degrees to vertical line E through axes F of rotation of discs 50, 52. This arrangement of discs 50, 52 effects the necessary widening of the slit formed by disc 48, to provide a furrow to receive seed.

As shown in FIGS. 2, 3, 4 and 6, some of coulters 36 are located forwardly of others, the coulters being arranged in two rows 56, 58, the rows extending transverse to direction D and being offset from each other in direction D by 40 centimeters. The coulters 36 of front row 56 are arranged alternately with the coulters 36 of rear row 58 across the width of the drill.

Figure 3:
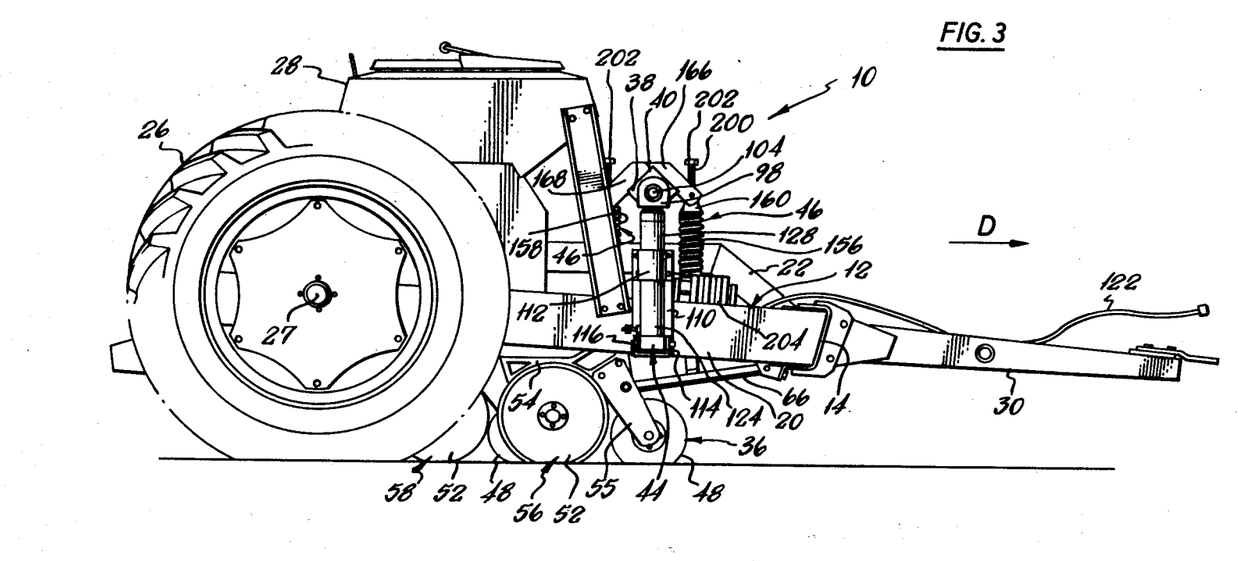
FIG. 3 shows a side elevation view of the drill of FIG. 1, the direction of viewing being indicated by arrow III in FIG. 1, and the drill being shown in its working condition.

As shown in FIG. 3, the coulters of rear row of coulters 58 lie wholly directly below hopper 28 and at least a portion of each coulter of front row 56 lies directly below the hopper. Mounting means 60, 62 whereby the coulters of rows 56, 58 respectively are mounted in these positions on frame 12 so that they can be raised and lowered relative to the frame will now be described.

Mounting means 60 for each coulter 36 of front row 56 of coulters comprises upper and lower pivoted links 64 and 66 respectively which are substantially equal in length and are arranged substantially parallel to each other. The single upper link 64 is positioned directly above the single lower link 66. At their forward ends with respect to direction D, each pair of links is pivotally connected by upper and lower pivot pins 68, 70 respectively to its own bracket 72 mounted on front beam 14 of frame 12, and at their rear ends the pair of links is pivotally connected by upper and lower pivot pins 74, 76 respectively to the coulter body structure 54.

Thus it will be appreciated that mounting means 60 of each coulter of front row 56 amounts to a parallelogram linkage which permits each coulter 36 to be raised and lowered relative to frame 12 while maintaining the attitude of the coulter relative to the frame substantially constant during such raising and lowering. However, the term "parallelogram linkage" and references to the links 64, 66 as "parallel to each other" or similar expressions in that context are to be interpreted in the light of the following paragraph.

Upper link 64 of each coulter mounting means 60 is length adjustable by a small amount to permit adjustment of the attitude of the coulter 36 as a whole. The amount of adjustment provided is sufficient to permit compensation for differential wear of disc 48 and discs 50, 52 and restoration of a predetermined spacial relationship of the slit opening disc 48 to slit-widening discs 50, 52 after a period of use during which the smaller and more heavily loaded slit opening disc has been more worn than discs 50, 52. The requirement for such an adjustment arises from the need in a triple disc coulter of this kind for the slit-opening disc 48 always to "lead" the slit-widening discs in the sense of being positioned to cut into the soil slightly deeper than the slit-widening discs by an amount "L" of for example 17 millimeters, as shown in FIG. 3. A lead of 17 millimeters is appropriate for cereals. For smaller seeds such as kale and rape the lead is reduced e.g. to 6 millimeters. This ensures that even when the coulter crosses depressions in the soil during use it will nevertheless produce at least a small furrow in which seed can be deposited.

However, after prolonged use each slit-opening disc 48 is reduced in diameter by wear and the extent of its "lead" becomes zero or at least too small, so instead of fitting a new disc the coulter attitude is adjusted slightly to restore the necessary lead. In this way, the adjustment facility on upper pivoted links 64 increases the service life of the coulters, and although after adjustment, the linkage on which the coulter 36 is mounted deviates very slightly from being strictly a parallelogram, such deviation has very little significance in relation to attainment of the other advantages attributable to the geometry of the linkage—as will be apparent.

Figures 5, 7:
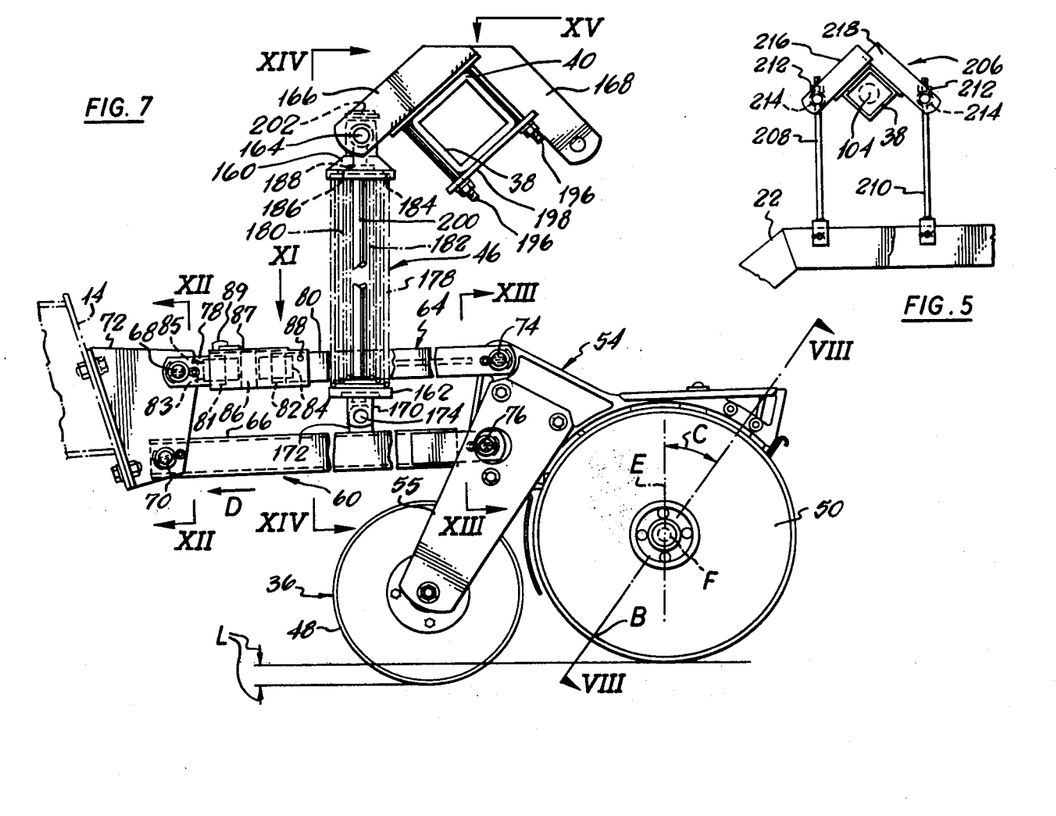
FIG. 5 is a sectional view, the section being in the plane indicated by arrows V—V in FIG. 1, FIG. 5 showing the structure of attitude control means for a coulter-actuating beam of the drill whereby the beam is held in a desired attitude during transport.
FIG. 7 shows another side elevation view, and is similar to FIG. 6 but includes the coulter actuating beam and a coiled compression spring assembly to transmit thrust from the beam to a coulter.
Figure 6:
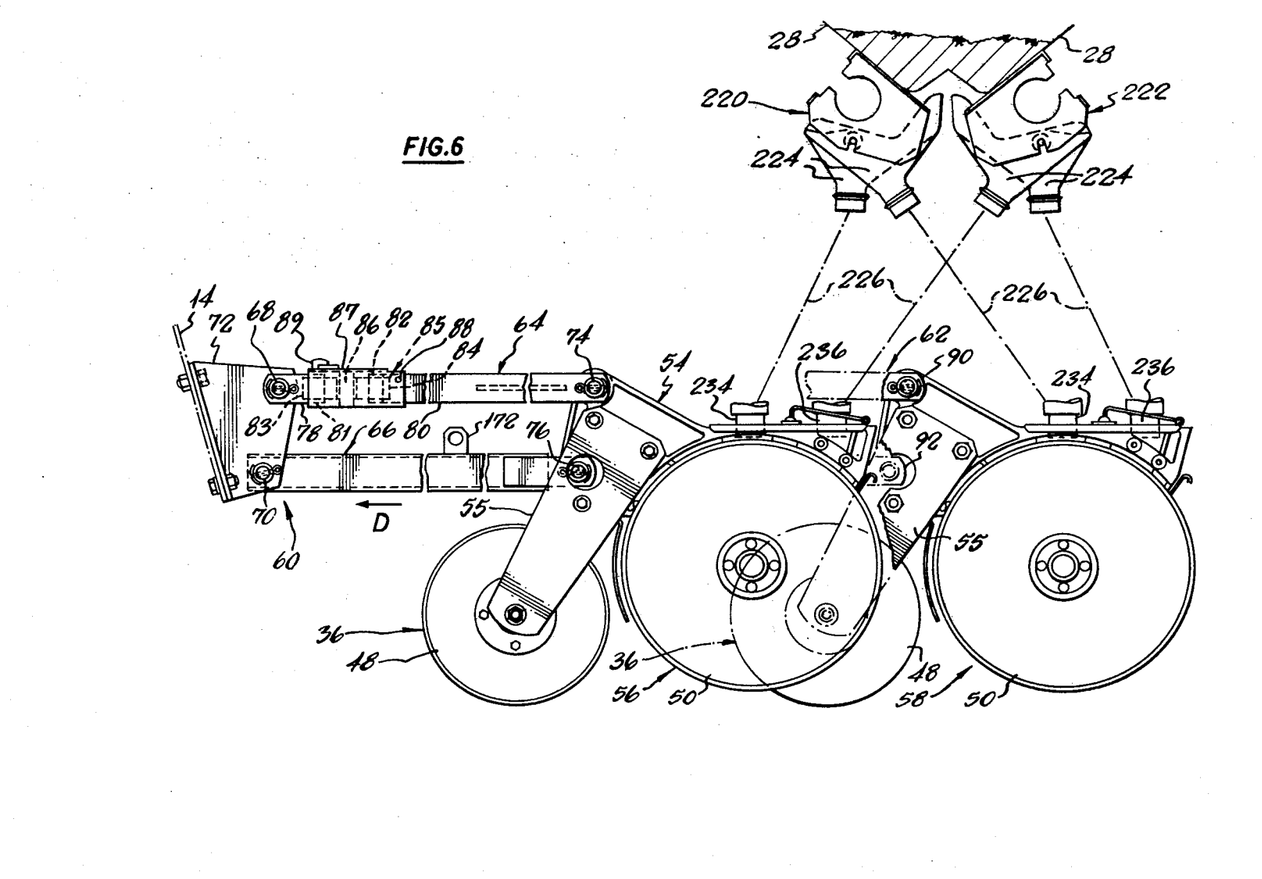
FIG. 6 shows a side elevation view of a portion of the drill of FIG. 1, the direction of viewing being the same as in FIG. 4 and FIG. 6 showing on a larger scale a portion of FIG. 4 and including more detail.
Figure 11:
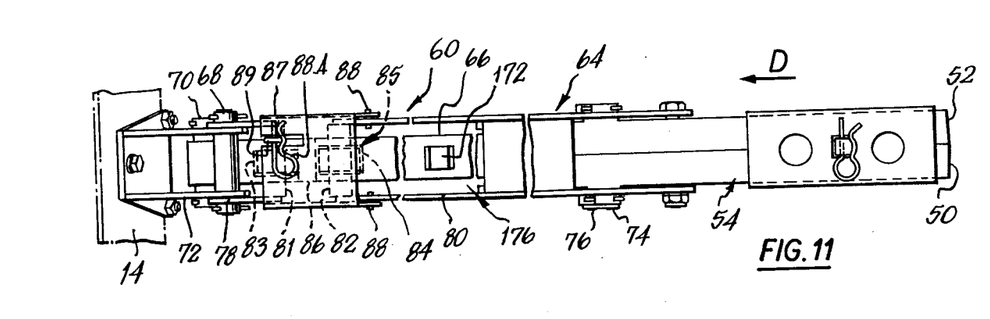
FIG. 11 shows a plan view of one of a series of pairs of pivoted links whereby the coulters are mounted on the frame of the drill, the direction of viewing being indicated by arrow XI in FIG. 7.
Figure 12:
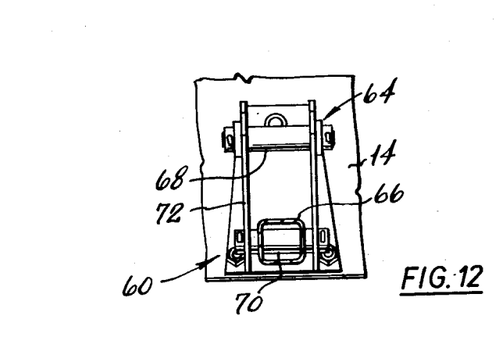
FIG. 12 shows a section through the pivoted links of FIGS. 7 and 11, the section being taken on the line XII—XII in FIG. 7.
Figure 13:
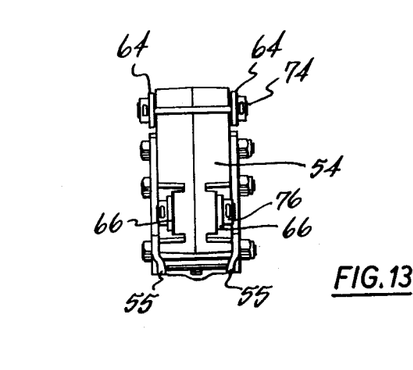
FIG. 13 shows another section through the pivoted links, the section being taken on the line XIII—XIII in FIG. 7.

Length adjustment of links 64 is provided, as shown in FIGS. 6, 7 and 11 by constructing each upper link from front and rear link portions 78, 80 respectively which are movable endwise relative to each other. The adjacent ends of the front and rear link portions are formed with blocks 81, 82 having screw-threaded sockets to receive the screw-threaded rods 83, 84 of an adjuster 85. The adjuster has a central nut 86, for engagement with a spanner carried on the drill to enable the adjuster to be turned easily. A cover 87 pivoted at 88 on rear link portion 80 is provided to lock adjuster 85 and protect the screw threads. The cover is secured in position by insertion of a lynch pin 88A into an apertured bracket 89 on front link portion 78. This arrangement is similar to that shown in perspective in FIG. 16. The direction of the screw threads of rods 83, 84 and blocks 81, 82 are such that rotation of adjuster 84 in one direction lengthens link 64 and rotation in the opposite direction shortens the link.

The extent of the adjustment provided by adjuster 84 is as follows. From a nominal length (between its pivot axes) of 48.26 centimeters (at which length, link 64 is exactly parallel to lower link 66), upper link 64 can be lengthened by 1.91 centimeters and shortened by 1.27 centimeters.

A similar adjustment facility giving the same range of adjustment is provided in mounting means 62 of the coulters 36 of the rear row 58 of coulters.

In the case of coulters 36 of rear row 58, that mounting means 62 is substantially identical to mounting means 60 of front row 56, comprising upper and lower pivoted links 90, 92, except that the pivoted links are longer than those of front row 56, being 88.90 centimeters long (with the same adjustment range in upper links 90, as mentioned above in connection with links 64.

Mounting means 94 whereby coulter actuating beam 38 is mounted on frame 12 so that the beam can be raised and lowered relative to the frame will now be described.

Thus, mounting means 94 for beam 38 comprises the thrust applying means in the form of hydraulic rams 42, 44 one at each end of the beam, together with articulated joint means in the form of two ball joints 96, 98 one on each of the rams and serving to connect the rams 42, 44 to their respective ends 100, 102 of beam 38. As already stated, rams 42, 44 are mounted on side beams 18, 20 of frame 12 and thus beam 38 is mounted on frame 12 by the rams through ball joints 96, 98. Furthermore the ball joints permit both angular movement of beam 38 about its longitudinal axis 104 relative to frame 12 and, since the ball joints 96, 98 effectively constitute pivot joints allowing pivotal movement of the beam relative to the frame about axis 106, 108 extending in direction D, the ball joints also permit during use, the ends 100, 102 of the beam to rise and fall independently of each other relative to frame 12. It will now be appreciated that double-acting rams 42, 44 are actuable to both raise and lower beam 38 relative to frame 12 and that, during use the rams transmit a down-thrust to the beam through the ball joints.

Figure 2:
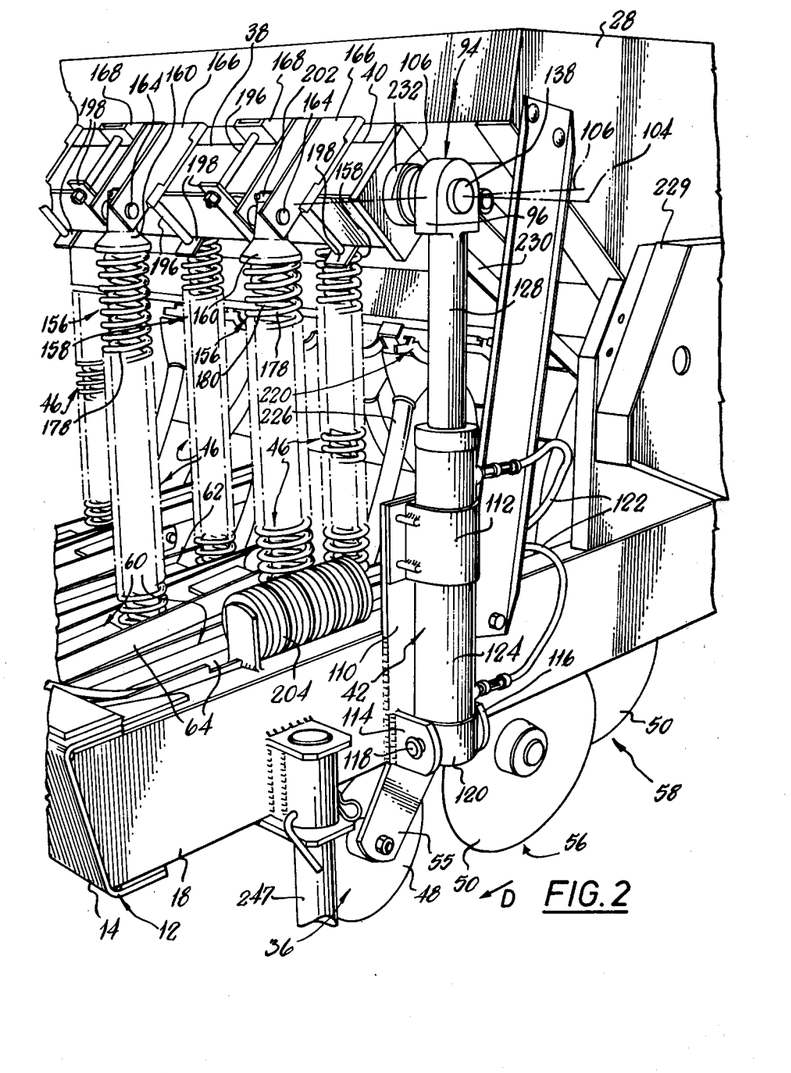
FIG. 2 shows, on a larger scale, a perspective view of a portion of the drill of FIG. 1, the direction of viewing being indicated by the arrow II in FIG. 1.

As shown in FIGS. 1 to 3, hydraulic rams 42, 44 are mounted on side beams 18, 20 of frame 12 by means of upright brackets 110 welded to the frame and each having an upper sleeve 112 and a pair of apertured flanges 114, 116 to receive their respective rams. The ram is inserted through sleeve 112 and then secured by a pin 118 which passes through flanges 114, 116 and through a bore in the solid lower end 120 of the ram.

The double-acting hydraulic rams 42, 44 are connected by two hoses 122 having quick-release couplings (not shown) to a spool valve on the tractor hauling the drill, whereby hydraulic pressure from the tractor's pump can be caused to extend or retract both rams simultaneously.

Rams 42, 44 themselves each comprise a cylinder 124, an annular piston 126 slidable in the cylinder, and a piston rod 128 to the upper end of which the respective ball joint 96 or 98 is welded and which at its lower end is secured by screw threads and a snap ring within piston 126 and sealed to the piston by an O-ring. Piston rod 128 slides in a sleeve assembly 130 including a seal, at the upper end of the cylinder. Fluid inlet and outlet ports 132, 134 are formed at the upper and lower ends of the cylinder for connection to hoses 122. Thus rams 42, 44 are each mounted with the cylinder 124 below the piston i.e. so that retraction of the ram moves the piston rod 128 downwards relative to the cylinder.

Figure 10:
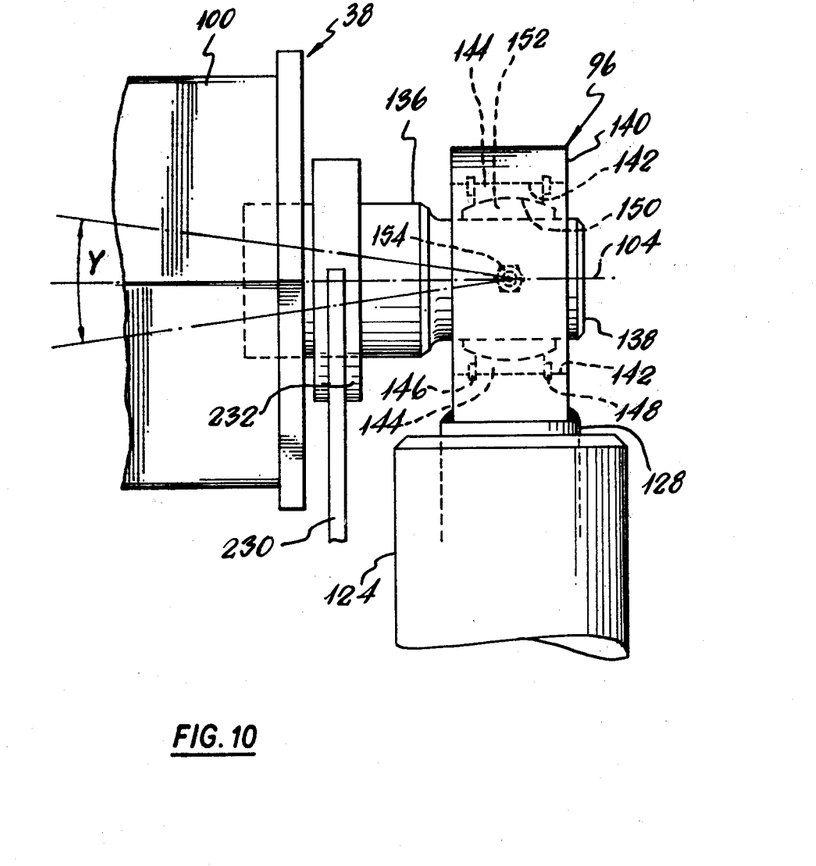
FIG. 10 shows on a larger scale a ball joint connecting the ram to the coulter-actuating beam, the direction of viewing being indicated by arrow X in FIG. 9.

The structure of ball joints 96, 98 and the manner in which they connect rams 42, 44 to coulter-actuating beam 38 is shown in detail in FIG. 10.

Each of the ends 100, 102 of beam 38 has a longitudinally projecting spigot 136 rigidly fixed thereto. A reduced diameter end portion 138 of the spigot is received in its respective ball joint 96 or 98.

The ball joints 96 and 98 themselves each comprise an outer housing 140 welded to the upper end of their respective piston rods 128. A cylindrical bore 142 extends through housing 140 and within the bore is located an annular inner bearing housing 144 which is retained in position by two snap rings 146, 148. The inner bearing housing has an inner surface 150 which is spherical in form and within which is located an annular bearing 152 having an outer surface which is spherical in form. Bearing 152 is freely movable within housing 144 to execute angular movement, and a grease nipple 154 is provided together with associated drillings and grooves (not shown) for lubrication of the bearing surfaces of the ball joint. End portion 138 of spigot 136 on beam 38 is received in bearing 152.

Figure 9:
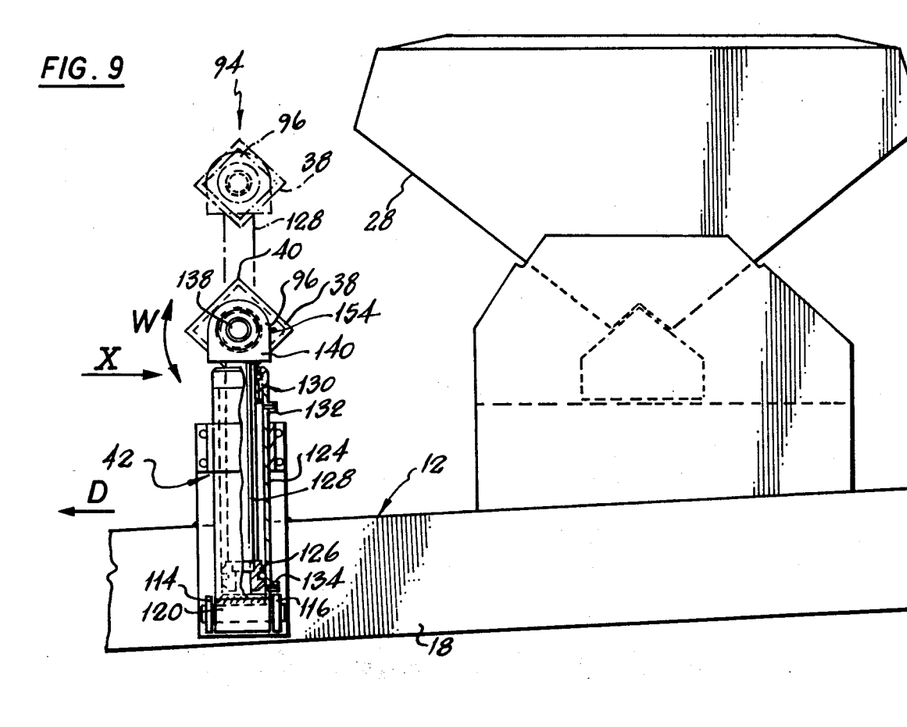
FIG. 9 shows a side elevation view of a portion of the drill of FIG. 1, the direction of viewing being similar to that of FIG. 4, FIG. 9 showing a hydraulic ram, the coulter-actuating beam mounted on the ram, and the hopper of the drill.

Coulter actuating beam 38 is thus able to execute angular movement about its longitudinal axis 104 relative to frame 12 as indicated by double-ended arrow W in FIG. 9, and is also able to execute angular movement in the direction indicated by double ended arrow Y in FIG. 10, which latter movement permits the ends 100, 102 of beam 38 to rise and fall independently of each other relative to frame 12.

The resilient thrust transmitting means 46 for transmitting downward thrust from coulter actuating beam 38 to coulters 36 is shown in FIGS. 1, 2, 3, 4 and 7. It comprises front and rear sets of coiled compression spring assemblies 156, 158 respectively, one spring assembly for each coulter 36, the front spring assemblies being connected to the coulters of front row 56 and the rear spring assemblies being connected to the rear row of coulters 58. The spring assemblies are each connected to beam 38 and to the lower pivoted link 66 of its coulter by upper and lower spring seats 160, 162 respectively seen in FIGS. 2, 7 and 14.

Upper spring seats 160 are formed with trunnions 164 whereby they are pivotally connected to respective front and rear thrust arms 166, 168 secured to beam 38, and the lower spring seats 162 are provided with bifurcated brackets 170 within which a boss 172 on the lower coulter mounting link 66 is slidingly received and a pivot pin 174 inserted through aligned openings in the bracket and the boss. Spring assemblies 156 extend through openings 176 in upper links 64.

Spring assemblies 156 and 158 are identical to each other. Each assembly comprises three coiled compression springs 178, 180 and 182 arranged coaxially and nested one within the other. Spring seats 160, 162 have respectively, recessed and projecting spring-locating formations 184, 186, 188 and 190, 192, 194 to positively locate the springs.

Thrust arms 166, 168 are each clamped to beam 38 by a pair of bolts 196 passing on each side of the beam, a clamping plate 198 on the opposite side of the beam with respect to the thrust arm, and nuts on the bolts.

A coulter lift rod 200 is fixed to and extends upwardly from each lower spring seat 162, through springs 178, 180, 182, and is a sliding fit in a bore formed in the upper spring seat. A lift abutment 202 is fixed to the upper end of the rod.

Details of the connection of the rear thrust arms 168 to the lower pivoted links 92 of the rear row 58 of coulters 36 through spring assemblies 158 are not shown in FIG. 7 but are similar to those described above in relation to the front thrust arms 166 and front row 56. The general arrangement is shown in FIG. 4, and as can also be seen in FIG. 4, rear spring assemblies 158, which are connected to the rear row 58 of coulters 36, are connected to beam 38 on the rear side of the longitudinal axis 104 of the beam, whereas the front spring assemblies 156, which are connected to the front row 56 of coulters 36, are connected to beam 38 on the forward side of axis 104. It will therefore be understood that when, in use, beam 38 is moved downwards by rams 42, 44 relative to frame 12 to actuate coulters 36 through spring assemblies 156, 158, the spring assemblies will exert reaction forces on the beam through thrust arms 166, 168, and these forces have opposed moments about axis 104. As seen in FIG. 4, spring assemblies 156 and 158 exert reaction forces having, respectively, clockwise and anticlockwise moments about axis 104.

Furthermore, it will now also be seen that a consequence of the arrangement just described whereby the front and rear rows 56, 68 of coulters 36 exert on beam 38, during use, reaction forces having opposed moments about the axis 104 about which the beam can pivot, is that changes in loading of the coulters can be distributed between the front and rear rows of coulters by angular movement (arrow W in FIG. 9) of the beam about axis 104.

In this embodiment, drill 10 is a fifteen row drill, having eight coulters 36 in front row 56 and seven coulters 36 in rear row 58. Therefore, in order to ensure that all the coulters are loaded equally (and therefore penetrate the soil equally), it is necessary to compensate for this difference in numbers of coulters by means of the geometry of the mechanism, having regard to the relative lengths of the thrust arms 166, 168 and of the short and long coulter mounting links 64, 66 and 90, 92, together with the position along the length of each link at which the downward load is applied through boss 172. In this embodiment the rear thrust arms 168 have been chosen to be longer than the front thrust arms 166, but this is only one of many possible ways of achieving such compensation.

As shown in FIGS. 1 to 4 and 9, hydraulic rams 42, 44 are each mounted with the cylinder 124 below the piston 126 i.e., so that it is retraction of the rams which moves the coulters 36 into work, and removable stops 204 are provided which can be fitted round the piston rod 128 of each ram so as to engage abutment means (constituted by ball joints 96, 98) at the end of the piston rod to limit retraction of the piston rod and thereby limit lowering of coulter-actuating beam 38 relative to frame 12. Stops 204 are in the form of hinged metal clips which can be opened out against the action of a spring mounted on the clip, to fit round piston rod 128. The stops are stored in a stack on the side beams 18, 20 of frame 12 adjacent rams 42, 44. They enable the depth of penetration of coulters 36 to be positively limited.

Since coulter actuating beam 38 is journalled for angular movement about axis 104, it is desirable to ensure that when the beam is raised to raise coulters 36 for transport, the beam should always adopt a mean attitude whereby both the front and rear rows of coulters 56, 58 are raised equally. For this purpose there is provided attitude control means 206 shown in FIGS. 1 and 5 and supported by frame 12.

Attitude control means 206 comprises a pair of upstanding rods 208, 210 positioned in front of and behind coulter actuating beam 38 respectively. The rods are pivotally mounted on central frame beam 22 and provided with end stops 212 at their upper ends. Sliding abutments 214 are mounted on an extra pair of arms 216, 218 carried by coulter actuating beam 38 and similar to thrust arms 166, 168, the sliding abutments being a sliding fit on the rods 208, 210.

End stops 212 are positioned for engagement with sliding abutments 214 when beam 38 is in a raised position relative to frame 12 and it will be appreciated that if the beam is not in its mean position as regards angular movement about axis 104 (i.e., not in the FIG. 4 position), the end stops will turn the beam about axis 104 until it reaches the mean position (which is its transport attitude) and will hold it in this attitude.

Hopper 28 is divided by a central transverse partition (not shown) into a front seed compartment and a rear fertilizer compartment. Metering mechanism 220, 222 (see FIG. 6) measure out seed and fertilizer respectively which are delivered to the front and rear rows 56, 58 of coulters 36 through rubber feed spouts 224 and convoluted rubber feed tubes indicated in FIG. 6 by broken lines 226. Only the housings of metering mechanisms 220, 222 are shown in FIG. 6. The metering mechanisms are driven from ground wheels 24, 26 by a train of gears 228 (FIG. 4) in a housing 229. A clutch (not shown) is provided to interrupt the drive to the metering mechanisms when coulter actuating beam 38 is raised from its working position. The clutch is actuated by a control rod 230 (see FIG. 10) secured to a collar 232 which freely pivots on the spigot 136 at the left hand end 100 of beam 38. Rod 230 is effective to move an idler gear wheel (not shown) out of the gear train when beam 38 is raised. Further details of the metering mechanisms may be obtained from British patent specification No. 1.274.673 in the name of Massey-Ferguson-Perkins Ltd.

From the rubber tubes 226, seed and fertilizer passes into respective drop tubes 234, 236 located between the slit-widening discs 50, 52 of each coulter 36 and is dropped into the furrow in the soil.

In FIG. 4, the coulter body structures 54 are shown in two positions. The working or use height of the axis of rotation of the slit-widening discs 50, 52 is indicated by the arrow U and the transport height is indicated by the arrow T. Similarly, in FIG. 4, the transport positions of the coulter mounting links, and the coulter body structure have been indicated by the addition of a suffix "(T)" to the appropriate reference numerals. In the transport position of the coulters in FIG. 4 there is shown a press wheel 238 mounted behind slit-widening discs 50, 52 to close the furrow after seed and fertilizer has been dropped in it. Such a press wheel is mounted behind each coulter 36 but has only been shown in one place for clarity of illustration. The press wheel is journalled for rotation on a bifurcated arm 240 pivotally mounted at the rear of each coulter and urged downwards by a coiled torsion spring (not shown).

At the rear of the drill, behind rear frame member 16, there is provided a weight frame 242 mounted alongside frame member 16, in which a series of T-section concrete ballast weights 244 can be mounted to increase the weight of the drill and therefore increase its ability to penetrate hard untilled ground during direct drilling (no-till) work. Immediately behind the weight frame 242 is a platform 246 for a drill operator (if desired) and which assists loading of hopper 28.

Two retractible parking stands 247 are provided on frame 12 and a screw jack 247A on drawbar 30.

In use, drill 10 is drawn by a tractor and the hydraulic hoses 122 which connect hydraulic rams 42, 44 in parallel are connected to the tractor's hydraulic system.

Coulters 36 are lowered by retracting the pistons of rams 42, 44 to lower beam 38 relative to frame 12. Downward thrust is exerted on the pivoted links 66 and 92 of the front and rear rows of coulters by spring assemblies 156, 158 respectively, thereby causing the coulters to penetrate the earth. The depth of penetration is determined by the removable stops or by the pressure supplied to the rams.

Slit-opening discs 48 cut slits in the earth and the slits are widened by discs 50, 52 into furrows, and seed and fertilizer are simultaneously dropped therein. Press wheels 238 then close the furrows, which completes the sowing operation.

When drill 10 is operating on perfectly flat level ground, coulter actuating beam 38 has, during use, the attitude with respect to angular movement about its longitudinal axis 104 shown in FIG. 4. But, when the drill encounters a change in contour of the type wherein contour lines joining points of equal height extend at right angles to direction D, the front row 56 of coulters 36 will encounter the contour change before the rear row 58 and a change in the relative loadings of the coulters will result. However, the change in the loadings of the coulters will be distributed between the front and rear rows of coulters by angular movement of beam 38 about its longitudinal axis 104—clockwise as seen in FIG. 4 when the ground begins to rise or slope upwards, and anticlockwise when the ground begins to fall or slope downwards.

Furthermore, when the drill straddles contour changes extending in the opposite direction (i.e. ridges or the like extending in direction D), one end of coulter actuating beam 38 will be more highly loaded than the other end. In such a circumstance, if the depth of penetration of coulters 36 is being controlled by supplying fluid at a constant selected pressure to hydraulic rams 42, 44 then the more heavily loaded end of the beam will rise relative to frame 12 and relative to the other end of the beam, to equalize the loadings between the ends. Such angular movement of the beam about axes 106, 108 is permitted by ball joints 96, 98.

For transport, rams 42, 44 are extended to raise beam 38 whereby coulters 36 are raised by lift rods 200. On being raised, the beam is obliged by attitude control means 206 to adopt the transport attitude shown in the drawings, thereby maximising transport height of the coulters. FIG. 4 shows beam 38 at three positions. The upper position is the transport position. The intermediate position is the beam position when the coulters 36 are in contact with the ground under zero load, and the lower position is a working position.

Figure 16:
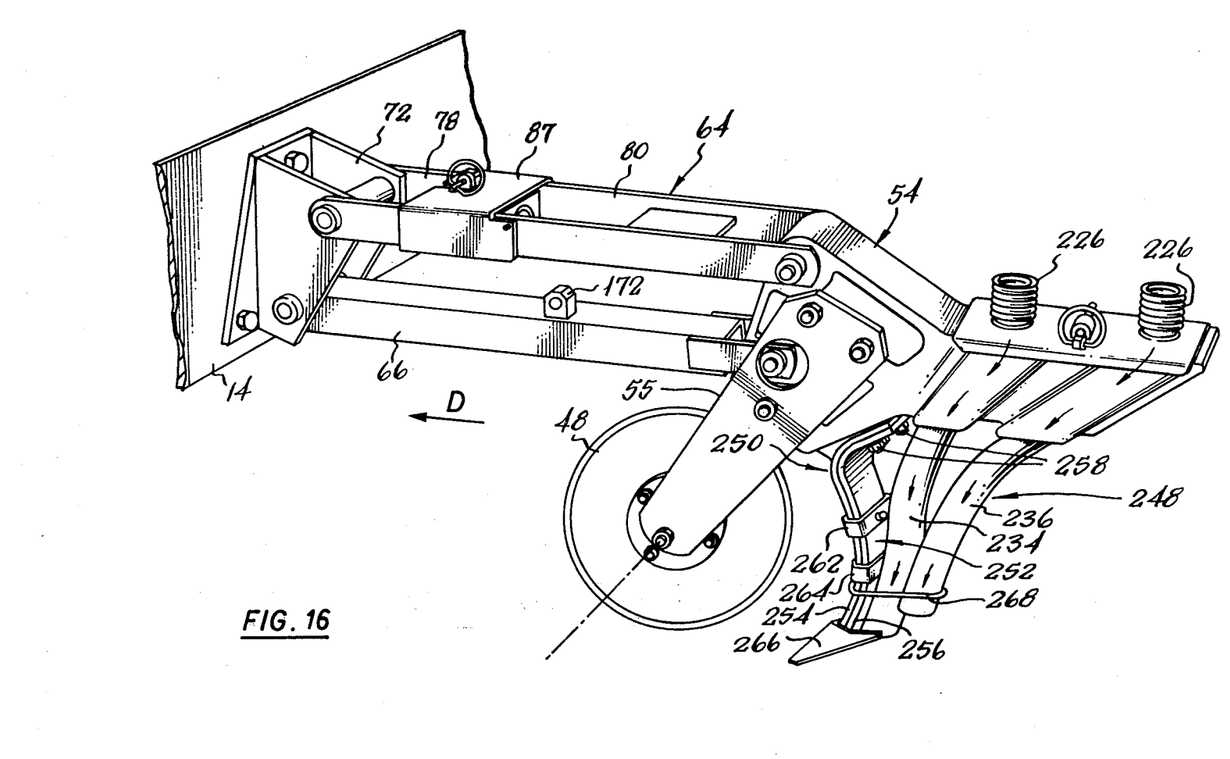
FIG. 16 shows a perspective view of an alternative coulter assembly and the pivoted links on which it is mounted, for the embodiment of FIGS. 1 to 15.

FIG. 16 shows an alternative coulter assembly 248 for use in place of the triple disc coulter assemblies 36 described above. The coulter assembly is mounted on frame 12 of the drill as described above and corresponding parts are given the same numbers in FIG. 16 as in the other drawings.

The first soil-engageable member of coulter assembly 248 comprises a slit opening disc 48 as in the previous embodiment. However, the second soil-engageable member comprises a tine 250 positioned behind disc 48 with respect to direction D.

Tine 250 comprises a resilient curved shank 252 formed from two leaf springs 254, 256 secured at their upper ends by bolts 258 to the rear of coulter body structure 54, and held together in the region of their lower ends by encircling clips 262, 264. A point 266 is fastened to the lower end of tine 250. Drop tubes 234, 236 are secured by a spring wire clip 268 directly behind tine 250.

Coulter 248 operates in a similar manner to the triple disc coulters 36 but it reduces the likelihood of smearing the walls of the furrow in certain soil conditions and it also permits the use of a higher working speed for the drill in some soil conditions.

In a further embodiment (not illustrated) a second tine is mounted in a side-by-side relationship with tine 250.

The principal advantages provided by the above embodiments of the invention lie firstly in the optimum use of the limited space below the hopper to raise the coulters to a transport position. Previous proposals in which the coulters are mounted on single pivoted arms have the disadvantage that when raised for transport the coulters are quite steeply tilted, and the rear ends of relatively long coulters such as triple disc coulters prevent the front end of the coulter being raised to a satisfactory transport height.

Secondly the proper relative positions of the slit-opening and slit-widening discs are maintained by the parallelogram coulter-mounting linkages at different showing depths while at the same time simple means is provided for adjusting the attitude of the coulters relative to the ground to compensate for unequal wear of the slit-opening and slit-widening discs during use so as to maintain the proper "lead" of the slit opening discs during work—and this is achieved while maintaining satisfactory structural rigidity of the coulter mounting with respect to twisting forces.

The invention is applicable to all types of coulter having spaced soil engageable members positioned one behind the other i.e. to all coulters which are relatively long in the direction of operative forward motion of the drill.

We claim:

1. A grain drill including a frame, a drawbar mounted on the frame and extending forwardly therefrom, a hopper mounted on the frame, a plurality of furrow opening assemblies mounted on the frame, each furrow opening assembly including a coulter body structure, an upper link pivotally attached to the frame at one end and to the coulter body structure at the other end for pivotal movement about axies that are generally transverse to the direction of forward movement of the grain drill, a lower link substantially the same length as the upper link pivotally attached at one end to the frame below the upper link and at the other end to the coulter body structure, a first soil-engaging assembly including a slit opening disk attached to the coulter body structure, a second soil-engaging assembly including two slit-widening disks attached to the coulter body assembly for engaging the soil to the rear of the first soil-engaging assembly and adjustment means for adjusting the length of at least one of the links to adjust the soil penetration depth of the first soil-engaging assembly relative to the second soil-engaging assembly, and load means attached to the frame and to each furrow opening assembly for applying a downward force on each furrow opening assembly.

2. The grain drill of claim 1 wherein the adjustment means allows adjustment of the length of the upper link of each furrow opening assembly.

* * * * *